United States Patent [19]
Ugajin

[11] Patent Number: 6,023,261
[45] Date of Patent: Feb. 8, 2000

[54] TRANSLUCENT-IMAGE DISPLAY APPARATUS, TRANSLUCENT-IMAGE DISPLAY METHOD, AND PRE-RECORDED AND COMPUTER-READABLE STORAGE MEDIUM

[75] Inventor: Masashi Ugajin, Tokyo, Japan

[73] Assignee: Konami Co., Ltd., Hyogo-ken, Japan

[21] Appl. No.: 09/050,700

[22] Filed: Mar. 30, 1998

[30] Foreign Application Priority Data

Apr. 1, 1997 [JP] Japan ..................................... 9-083071

[51] Int. Cl.[7] ....................................................... G09G 5/00
[52] U.S. Cl. ........................... 345/113; 345/150; 345/199
[58] Field of Search ................................... 345/113, 114, 345/112, 115, 116, 150, 151, 152, 153, 154, 155, 199, 431, 432, 428, 426, 430

[56] References Cited

U.S. PATENT DOCUMENTS

| 4,827,253 | 5/1989 | Maltz ...................................... 345/113 |
| 5,351,067 | 9/1994 | Lumelsky et al. ...................... 345/113 |
| 5,900,862 | 5/1999 | Silverbrook et al. .................. 345/199 |

Primary Examiner—Xiao Wu
Attorney, Agent, or Firm—Jordan and Hamburg LLP

[57] ABSTRACT

A translucent-image display apparatus and method performs a process for displaying a translucent image. In the process, lower image data to be displayed on a screen, and upper image data to be displayed on the lower image are read. Color-palette data of the lower image and color-palette data of the upper image are read. Achromatic data having a brightness level identical to the brightness level of each color included in the color-palette data of the upper image are read. A superposing range in which the upper image is superposed on the lower image is defined based on the lower image data and the upper image data. First composite color data are generated by subtracting the color represented by the achromatic data from the color of the lower image in the superposing range, based on the color-palette data of the lower image and the achromatic data. Second composite color data are generated by adding the color represented by the color-palette data of the upper image to the first composite color data. And, the upper image is translucently displayed in the second composite color on the screen, based on the second composite color data. In the translucent-image display apparatus and method, a pre-recorded and computer-readable storage medium is used.

5 Claims, 8 Drawing Sheets

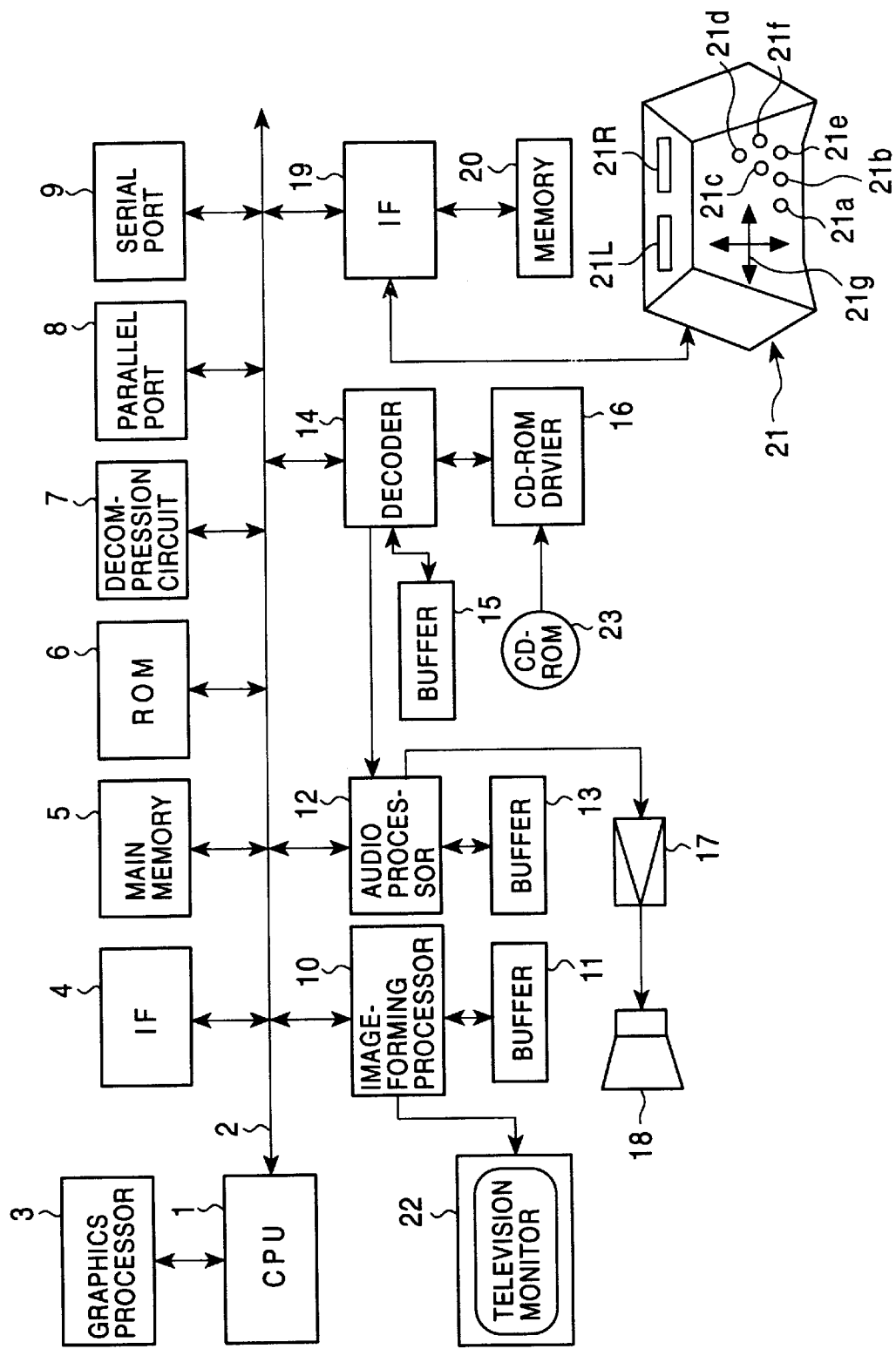

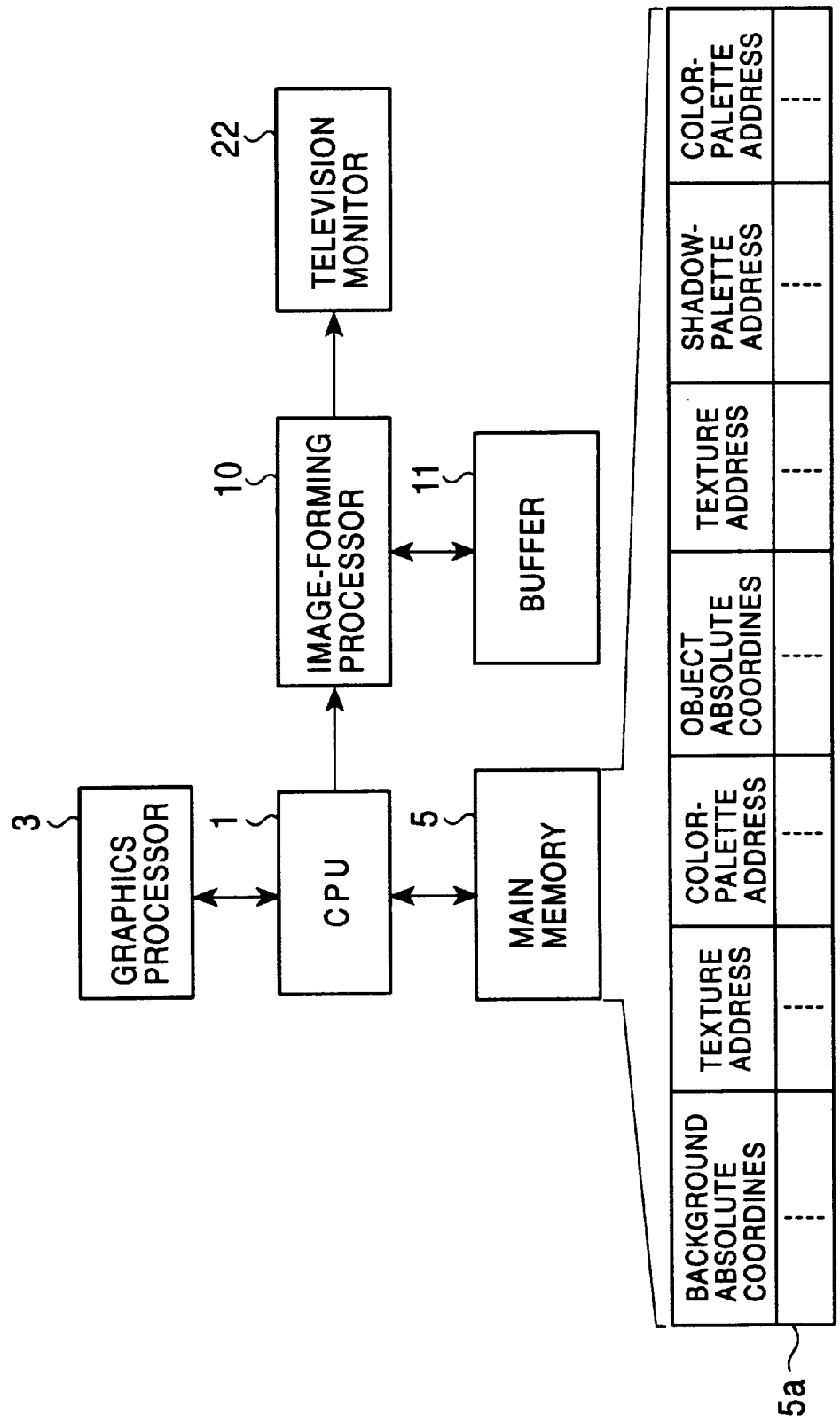

TRANSLUCENT-IMAGE DISPLAY APPARATUS, TRANSLUCENT-IMAGE DISPLAY METHOD, AND PRE-RECORDED AND COMPUTER-READABLE STORAGE MEDIUM

BACKGROUND OF THE INVENTION

1. Field of the Invention

The present invention relates to a translucent-image, display apparatus for displaying a translucent image on a screen, a method for displaying a translucent image, and a pre-recorded and computer-readable storage medium.

2. Description of the Related Art

A type of conventional video game system for executing a video game uses visual effects for a game player by displaying rays, electricity, flames, sparks, and so forth, on a screen. Many of the objects (object images and pictures) such as the rays and the electricity are translucently displayed on the screen by a translucent-image display function provided for the video game system. In addition, some types of video game system are designed to display the translucent image of an object by using any one of the following techniques: subtraction; averaging; first addition; and second addition. Subtraction is a technique in which 100% of the red, green and blue (RGB) brightness levels of the color of an object (e.g., electricity, spark, etc.) are respectively subtracted from 100% of the RGB brightness levels of the color of a base (e.g., the background of the game space).

Averaging is a technique in which 50% of the RGB brightness levels of the color of the object are respectively added to 50% of the RGB brightness levels of the color of the base.

First addition is a technique in which 100% of the RGB brightness levels of the color of the object are respectively added to 100% the RGB brightness levels of the color of the base.

Second addition is a technique in which 25% of the RGB. brightness levels of the color of the object are respectively added to 100% of the RGB brightness levels of the color of the base.

The translucent-image display function performed by the video game system consists of the above-described four techniques, and accordingly has the following problems:

According to first addition and second addition, when the color of the base is bright, in many cases, the processed results are a color in which each of the RGB brightness levels is approximately 100%, i.e. the color is white (R:100%; G:100%; B:100%). Consequently, the color of the object, which is displayed as a translucent image, is frequently a shadeless color or white. In many cases, with the shadeless color and white, the desired visual effects by displaying the translucent image of the object cannot be obtained. Accordingly, when the translucent image of the object is displayed by first addition or second addition, the color of the object must be set to a bright color beforehand. In other words, when the game space is designed to have a bright image by, for example, using a bright color for the background as a base, the translucent-image display cannot effectively be used.

The above-described four techniques also have a problem in which the color of the object frequently differs before and after the object is translucently displayed. Accordingly, when the color of the translucent image of the object is set to an arbitrary color, it is necessary to set the colors of the base and the translucent image of the object beforehand, which is complicated.

SUMMARY OF THE INVENTION

Accordingly, it is an object of the present invention to provide a translucent-image display apparatus capable of displaying the translucent image of an object in a color having shade and setting the color of the translucently displayed object image to the color of the object used before displaying the translucent image, a translucent-image display method, and a pre-recorded and computer-readable storage medium.

To this end, according to an aspect of the present invention, the foregoing object has been achieved through provision of a translucent-image display apparatus including: an image-data storage unit in which lower image data to be displayed on a screen, and upper image data to be displayed on the lower image are stored; a color-palette storage unit in which color-palette data of the lower image, and color-palette data of the upper image are stored; a shadow-palette storage unit in which achromatic data having a brightness level identical to the brightness level of each color included in the color-palette data of the upper image is stored; a range defining unit for defining a superposing range in which the upper image is superposed on the lower image, based on the lower image data and the upper image data; a first composite-color generating unit for generating first composite color data by subtracting the color represented by the achromatic data from the color of the lower image in the superposing range, based on the color-palette data of the lower image and the achromatic data; a second composite-color generating unit for generating second composite color data by adding the color represented by the color-palette data of the upper image to the first composite color data; and a translucent-image display processor for translucently displaying on the screen the upper image in the second composite color, based on the second composite color data.

Preferably, the first composite-color generating unit generates the first composite color data so that the first composite color is darker than the color represented by the color-palette data of the lower image.

The second composite-color generating unit may generate the second composite color data so that the second composite color is almost identical to the color represented by the color-palette data of the upper image.

According to another aspect of the present invention, the foregoing object has been achieved through provision of a translucent-image display method including the steps of: reading lower image data to be displayed on a screen, and upper image data to be displayed on the lower image; reading color-palette data of the lower image and color-palette data of the upper image; reading achromatic data having a brightness level identical to the brightness level of each color included in the color-palette data of the upper image; defining a superposing range in which the upper image is superposed on the lower image, based on the lower image data and the upper image data; generating first composite color data by subtracting the color represented by the achromatic data from the color of the lower image in the superposing range, based on the color-palette data of the lower image and the achromatic data; generating second composite color data by adding the color represented by the color-palette data of the upper image to the first composite color data; and translucently displaying on the screen the upper image in the second composite color, based on the second composite color data.

According to the present invention, the foregoing object has been achieved through provision of a computer-readable storage medium in which a computer program for causing a computer to perform a process for displaying a translucent image is stored, wherein the process includes the steps of: reading lower image data to be displayed on a screen, and upper image data to be displayed on the lower image; reading color-palette data of the lower image and color-palette data of the upper image; reading achromatic data having a brightness level identical to the brightness level of each color included in the color-palette data of the upper image; defining a superposing range in which the upper image is superposed on the lower image, based on the lower image data and the upper image data; generating first composite color data by subtracting the color represented by the achromatic data from the color of the lower image in the superposing range, based on the color-palette data of the lower image and the achromatic data; generating second composite color data by adding the color represented by the color-palette data of the upper image to the first composite color data; and translucently displaying on the screen the upper image in the second composite color, based on the second composite color data.

Types of the storage medium may include a read-only memory, a random access memory, a compact-disc read-only memory, a hard disc, a magneto-optical disc and a floppy disc.

BRIEF DESCRIPTION OF THE DRAWINGS

FIG. 1 is a block diagram showing a video game system including a translucent-image display apparatus according to an embodiment of the present invention.

FIG. 4 is a block diagram showing part of the translucent-image display apparatus shown in FIG. 1.

DESCRIPTION OF THE PREFERRED EMBODIMENTS

Figure 2A:
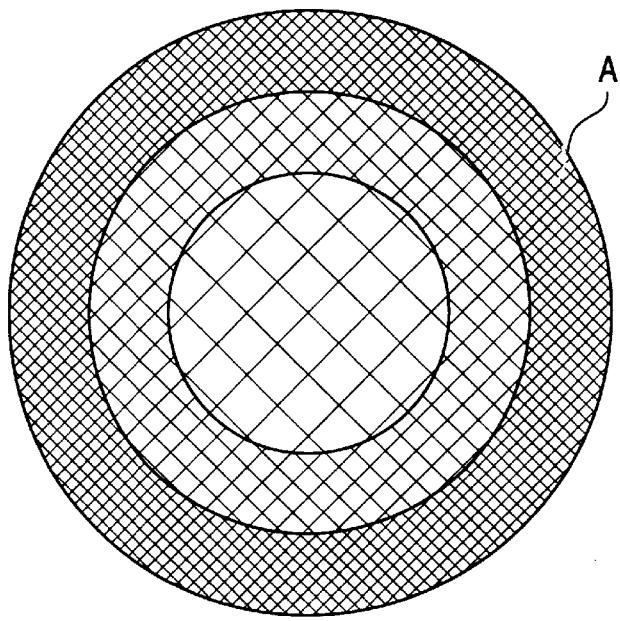
FIGS. 2A, 2B and 2C are charts illustrating an object, color-palette data and shadow-palette data, respectively.
Figure 2B:
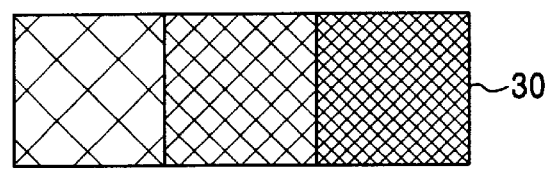

The following embodiments of the present invention will be described with reference to the attached drawings.

[Structure of Video Game System]

The structure of a video game system to which a translucent-image display apparatus according to an embodiment of the present invention is applied will be described. FIG. 1 shows a block diagram of a video game system. The video game system includes a main unit and a controller 21. The main unit has a built-in compact-disc read-only memory (CD-ROM) 23 as a computer-readable storage medium holding image data, audio data, game programs (computer programs), etc. The main unit is also connected to a television monitor 22.

The main unit includes a central processing unit (CPU) 1, a graphics processor 3 directly connected to the CPU 1, an interface circuit 4 connected to the CPU 1 via an address bus, a data bus and a control bus (the buses represented as a line in FIG. 1), a main memory 5, a read-only memory (ROM) 6, a decompression circuit 7, a parallel port 8, a serial port 9, an image-forming processor 10, an audio processor 12, a decoder 14, an interface circuit 19, a buffer 11 connected to the image-forming processor 10, a buffer 13 and an amplification circuit 17 both connected to the audio processor 12, a speaker 18 connected to the amplification circuit 17, a buffer 15 and a CD-ROM driver 16 both connected to the decoder 14, and a memory 20 connected to the interface circuit 19. The television monitor 22 is connected to the image-forming processor 10.

The graphics processor 3 functions as a so-called "co-processor" of the CPU 1. In other words, the graphics processor 3 performs in parallel coordinate transformation. processing and light source calculation, such as operations of fixed-point matrices and vectors. The coordinate transformation processing is performed such that the address of an image to be processed on the display area of a the buffer 11 is found based on the coordinate data of each vertex, motion data and rotational data, on the two-dimensional or three-dimensional plane of the image to be processed, which is supplied from the CPU 1, and the obtained address data is returned to the CPU 1. The light source calculation is performed such that the lightness of the image to be processed is calculated in accordance with the vector data of a ray, normal-line data representing the directions of the planes of polygons, and data representing the color of the planes.

The interface circuit 4 is an interface with peripheral devices, for example, pointing devices such as a mouse and a track ball. The ROM 6 holds program data as an operating system for the main unit, which corresponds to a basic input output system for a personal computer. The main memory 5 holds game data loaded from the CD-ROM 23.

The decompression circuit 7 decompresses an image compressed by intra-coding based on the moving picture experts group (MPEG) and the joint photographic coding experts group (JPEG). This decompression includes decoding (the decoding of data encoded based on a variable length code (VLC)), dequantization, inverse discrete cosine transform, and intra-image restoration.

The image-forming processor 10 forms images for the buffer 11, based on image-forming commands issued by the CPU 1. The buffer 11 consists of the mentioned display area and a non-display area. The display area is an area in which data to be displayed on the display screen of the television monitor 22 is developed. The non-display area is an area in which texture data and color palette data are stored. The texture data is two-dimensional image data. The color palette data is data for designating the color of the texture data or the like. The CPU 1 reads from the CD-ROM 23 the texture data and the color palette data once or a plurality of times in accordance with the progress of a game. The read texture and color-palette data are stored in advance in the non-display area of the buffer 11.

The image-forming commands include, for example, a command for drawing a line, a command for using polygons to form the image of a stereoscopic object, and a command for forming a normal two-dimensional image. The polygons are polygonal two-dimensional images, and each vertex thereof is a polygonal vertex. The object pseudo-three-dimensionally displayed on the screen of the television monitor 22 is normally a solid composed of a plurality of polygons.

The command for drawing a line includes: data representing a line-drawing start address and a line-drawing end address; and data representing a color and line style. The command for drawing a line is directly issued to the image-forming processor 10 by the CPU 1.

The command for using polygons to form the image of a stereoscopic object includes: polygonal vertex address data representing the address of each polygonal vertex included in the object, which is in the display area of the buffer 11; texture address data representing the storage location of texture data to be pasted on the polygons, which is in the non-display area of the buffer 11; color-palette address data representing the storage location of color-palette data representing the texture-data color, which is in the non-display area of the buffer 11; and lightness data representing the lightness of the texture. The polygonal vertex address data is coordinate data obtained such that the graphics processor 3 performs the coordinate transformation of the absolute coordinate data of each polygonal vertex received from the CPU 1 in a virtual three-dimensional space, based on the motion data and the rotational data received from the CPU 1.

The command for forming a normal two-dimensional image includes: vertex address data; texture address data; color-palette address data; and lightness data representing the lightness of the texture. The vertex address data is coordinate data is obtained such that the graphics processor 3 performs the coordinate transformation of the two-dimensional vertex coordinate data received from the CPU 1, based on the motion data received from the CPU 1.

The audio processor 12 converts pulse-code modulated audio data read from the CD-ROM 23 to adaptive-differential-pulse-code modulated data. The ADPCM data processed by the audio processor 12 is output as sound from the speaker 18.

The CD-ROM driver 16 reads a game program, and data like map information, image data, and audio data from the CD-ROM 23, and supplies them to the decoder 14.

The decoder 14 uses error correction codes to performs error correction for the reproduced data from the CD-ROM 16, and supplies the error-corrected data to the main memory 5 or the audio processor 12.

The memory 20 is a card memory, and holds various parameters obtained when the game is interrupted in order to save the game status.

The controller 21 is provided with a cross key 21g functioning as a left key, a right key, an up key and a down key, a left button 21L, a right button 21R, a start button 21a, a selection key 21b, and first to fourth buttons 21c to 21f. The cross key 21g is used for a game player to command the CPU 1 to move the display up, down, right and left.

The start button 21a is used for the game player to direct the CPU 1 to start executing a game program loaded from the CD-ROM 23. The selection button 21b is used for the game player to direct the CPU 1 to select options concerning the game program loaded in the main memory 5. The functions of the left button 21L, the right button 21R and the first to fourth buttons 21c to 21f differ depending on the type of the game program loaded from the CD-ROM 23. An outline of the operation of the above-described video game system is as follows: When the CD-ROM 23 is loaded into the CD-ROM driver 16, supplying the video game system with power causes the CPU 1 to direct, based on the operating system stored in the ROM 6, the CD-ROM driver 16 to read image data, audio data, game program data (including data for use in the execution of a program), and so forth, from the CD-ROM 23. Accordingly, the CD-ROM driver 16 reads the image data, the audio data, the game-program data, and so forth, from the CD-ROM 23, and supplies them to the decoder 14. The decoder 14 performs error correction for the supplied image, audio and gameprogram data.

The error-corrected image data processed by the decoder 14 is supplied to the decompression circuit 7 via the bus 2. The decompression circuit 7 decompresses the supplied image data, and supplies the decompressed image data to the image-forming processor 10 via the bus 2. The image-forming processor 10 writes the supplied image data in the non-display area of the buffer 11. The error-corrected audio data processed by the decoder 14 is supplied and written to the main memory 5 or the audio processor 12 via the bus 2.

The error-corrected game-program data processed by the decoder 14 is supplied and written to the main memory 5.

Thereafter, the CPU 1 proceeds with the game, based on the game program stored in the main memory 5, or a command input with the controller 21 by the game player. In other words, the CPU 1 properly implements image processing control, audio processing control, or internal processing control in accordance with directions from the game program or the game player. The image processing control is, for example, to issue a coordinate transformation command or a light-source calculation command to the graphics processor 3, and to issue various image-forming commands to the image-forming processor 10. The audio processing control is, for example, to issue an audio output command to the audio processor 12, and to designate a level or reverb. The internal processing control is, for example, calculation in accordance with the operation of the controller 21.

The operation of the CD-ROM system when displaying the image of a polygon-used stereoscopic object on the television monitor 22 will be described as an example of the image processing control.

It is assumed that a table for holding the absolute coordinate data of polygons included in the object, the rotational data of the object, and the motion data of the object is created in the main memory 5. In addition, a table holding the above-described texture address data and color-palette address data is created in the main memory 5.

The CPU 1 reads from the table the absolute coordinate data of polygons included in the object, the rotational data of the object and the motion data of the object, and transfers the read data to the graphics processor 3. The graphics processor 3 transforms the polygonal absolute-coordinate data to polygonal-vertex address data, based on the transferred rotational data and motion data of the object. Successively, the graphics processor 3 transfers the generated polygonal-vertex address data to the CPU 1.

The CPU 1 reads from the table the texture address data and the color-palette address data, and transfers these and the polygonal-vertex address data to the image-forming processor 10.

Based on the polygonal-vertex address data, the image-forming processor 10 defines on the display area of the buffer 11 a polygonal plane area (area surrounded by straight lines among the vertexes of the polygons). Successively, based on the texture address data and the color-palette data, the image-forming processor 10 reads from the non-display area of the buffer 11 the texture data and color palette data corresponding to the polygonal-vertex address data. The image-forming processor 10 writes the read image-forming data in the defined polygonal plane area. This process is generally called "texture pasting". In the above manner, the display-image data of the object is stored in the display area of the buffer 11. The image-forming processor 10 outputs to the television monitor 22 the contents stored in the display area of the buffer 11.

When the image-forming processor 10 stores the display-image data of the object in the display area of the buffer 11, in which base display-image data such as a background have been already stored, it generates composite data having the object display-image data on the base display-image data. At this time, the image-forming processor 10 is set to translucently display the object on the screen of the television monitor 22 by the following predetermined techniques.

The predetermined techniques are subtraction, averaging, first addition and second addition.

Subtraction is a technique in which 100% of the RGB brightness levels of the color of an object are respectively subtracted from 100% of the RGB brightness levels of the color of a base.

Averaging is a technique in which 50% of the RGB brightness levels of the color of the object are respectively added to 50% of the RGB brightness levels of the color of the base.

First addition is a technique in which 100% of the RGB brightness levels of the color of the object are respectively added to 100% the RGB brightness levels of the color of the base.

Second addition is a technique in which 25% of the RGB brightness levels of the color of the object are respectively added to 100% of the RGB brightness levels of the color of the base.

The television monitor 22 displays the object image on its display screen, based on the input display-image data. The television monitor 22 is set so that, for example, the object image has 30 frames per second, in other words, it is rewritten every period of 1/30 seconds. The number of frames per second may be arbitrarily set.

[Method for Displaying Translucent Image]

Figure 2C:
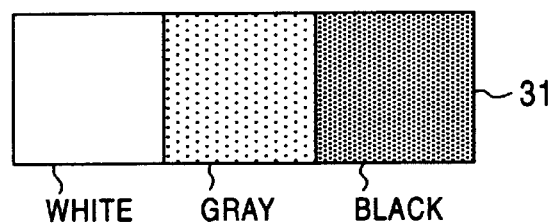
Figure 3A:
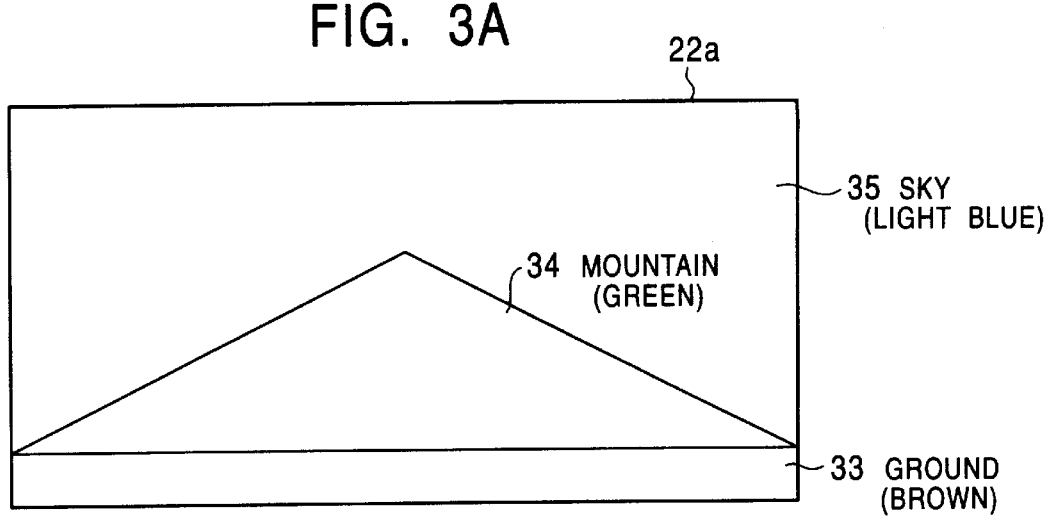
FIGS. 3A, 3B and 3C are charts illustrating a translucent-image display method according to the present invention.

A method for displaying a translucent image according to an embodiment of the present invention will be described with reference to FIGS. 2A to 2C and 3A to 3C. Specifically, the following description relates to a method for displaying the translucent image of object A on a background 22*a* in a case where there are the image of object A indicating a fireball, composed of three concentric circles, as shown in FIG. 2A, and the background 22*a* composed of a brown ground 33, a green mountain 34 and a bright light-blue sky 35, as shown in FIG. 3A.

It is assumed that the color-palette data of object A, and shadow-palette data composed of white, gray or black formed by removing chroma information from the color-palette data are prepared. For example, when object A is set so that it has three red gradations (three colors) having a lightness increased in proportion to the distance from its periphery to its center, color-palette data 30 (shown in FIG. 2B) composed of three red gradations corresponding to object A is prepared. In addition, as shown in FIG. 2C, shadow-palette data 31, composed of achromatic colors (white, gray and black) corresponding in lightness to the respective colors of the color-palette data 30, is prepared.

Figure 3B:
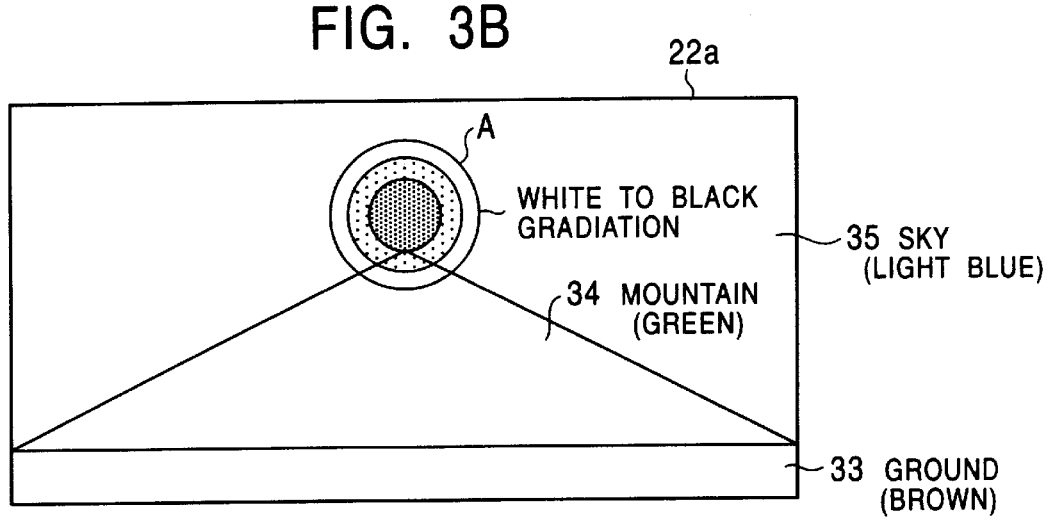
Figure 3C:
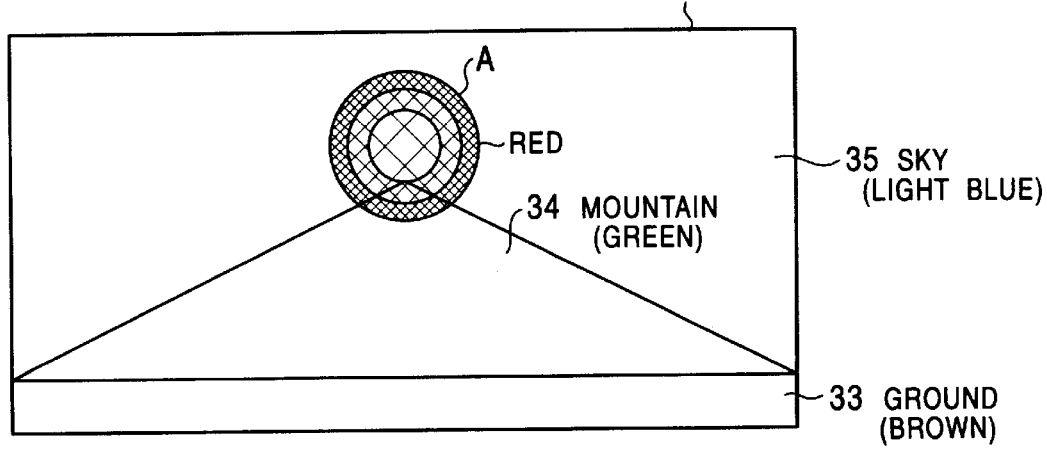

Next, as shown in FIG. 3B, a location in which object A is superposed on the ground 22*a* is defined. The above-described subtraction is used to process the colors of the background 22*a* on which object A is superposed, and the colors of the shadow-palette data 31 of object A corresponding to the colors of the background 22*a*. In other words, 100% of the RGB brightness levels of the colors of the shadow-palette data 31 are respectively subtracted from 100% of the RGB brightness levels of the sky 35, and 100% of the RGB brightness levels of the colors of the shadow-palette data 31 are respectively subtracted from 100% of the green of the mountain 34.

Accordingly, the color (first composite color) generated by subtraction is a color in which the lightness of each gradation is low, namely, a dark color. Object A is translucently displayed in the first composite color, having gradations in which the lightness decreases from the periphery of the circle to its center, as shown in FIG. 3B. Successively, the first composite color generated by subtraction and the color of the color-palette data 30 are processed by the above-described second addition. The color (second composite color) generated by second addition is a color whose RGB brightness levels are almost identical to the RGB brightness levels of the color-palette data 30. Object A is translucently displayed in the second composite color, having gradations in which the lightness and saturation increase from the periphery of the circle to its center. At this time, part of the translucently displayed object A whose shade is strongly expressed when the part is colored in accordance with the color-palette data 30 is displayed, having a strong shade. Conversely, another part whose shade is weakly expressed is displayed so as to be tuned with the background 22*a* as a base in proportion to the weakness of the shade. In this manner, even if the colors of the background 22*a* are bright, object A can be displayed in a color having a shade.

[Process by Video Game System]

A process performed by the video game system when it implements the above-described method for displaying a translucent image will be described.

Figure 5:
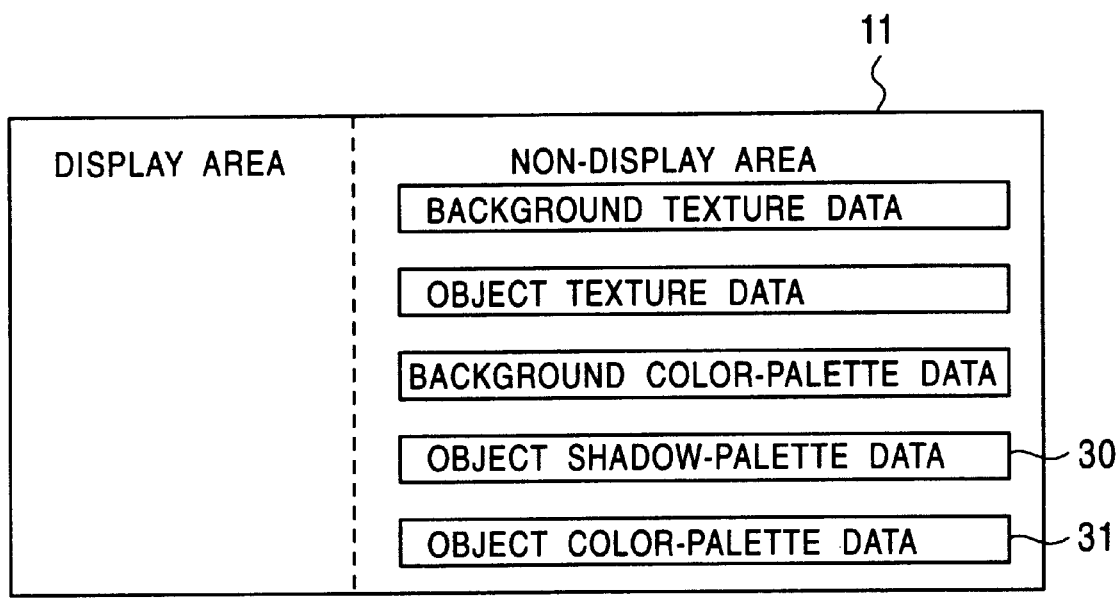
FIG. 5 is a chart illustrating a buffer included in the translucent-image display apparatus shown in FIG. 1.

FIG. 4 shows a block diagram of the components of the video game system for displaying a translucent image. FIG. 5 illustrates the buffer 11.

As shown in FIG. 4, the CPU 1, the graphics processor 3 and the image-forming processor 10 execute a translucent-image display process, in accordance with the program loaded into the main memory 5 and various types of data stored in the buffer 11. The processed results are output to the television monitor 22.

In the main memory 5, a table 5*a* holding necessary data for the translucent-image display process is created when the game program is loaded from the CD-ROM 23. The table 5*a* holds the absolute coordinate data of polygons of the background 22*a* (ground 33, mountain 34 and sky 35) as a base, and the texture address data and color-palette address data of the background 22*a*. The table 5*a* also holds the absolute coordinate data and texture address data of polygons of object A, the address data of the shadow-palette data 31, and the address data of the color-palette data 30.

As shown in FIG. 5, in the non-display area of the buffer 11, the texture data and the color-palette data of the background 22*a* are stored. In the non-display area of the buffer 11, the texture data of object A, the color-palette data 30 of object A, and the shadow-palette data 31 of object A are also stored.

Figure 6:
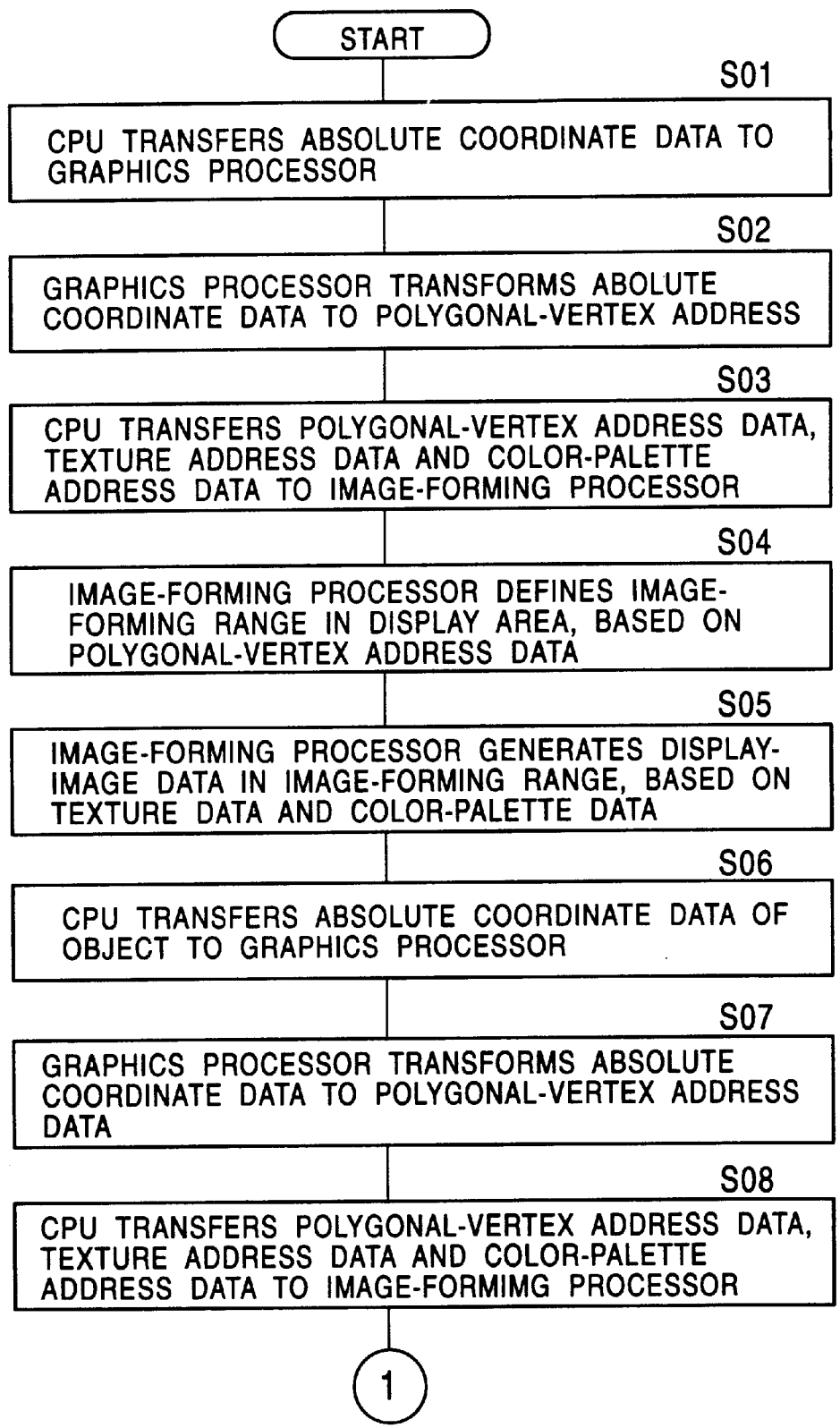
FIG. 6 is a flowchart illustrating the process of displaying a translucent image by a video game system.
Figure 7:
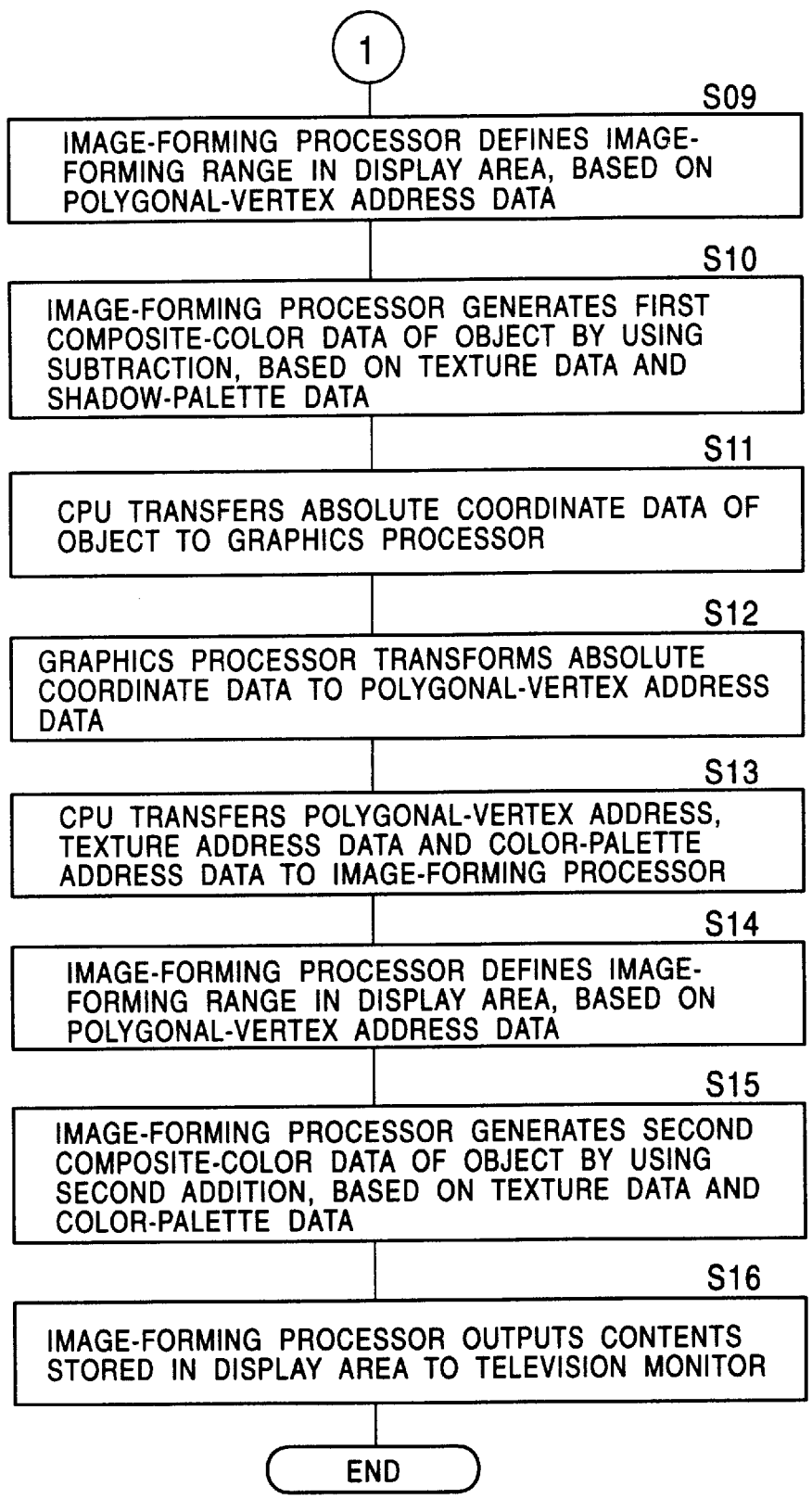
FIG. 7 is a further flowchart illustrating the process shown in FIG. 6.

FIGS. 6 and 7 show a flowchart of the translucent-image display process performed by the video game system.

The translucent-image display process is started when, for example, a command for displaying the translucent image of object A on the background 22*a* is issued by executing the game program.

As shown in FIG. 6, in step S01, the CPU 1 reads the absolute coordinate data of the background 22*a* from the table 5*a*, and transfers the read data to the graphics processor 3. The process proceeds to step S02.

In step S02, the graphics processor 3 transforms the absolute coordinate data of the background 22*a*, transferred in step S01, to polygonal-vertex address data. The graphics processor 3 transfers the transformed polygonal-vertex address data to the CPU 1. The process proceeds to step S03.

In step S03, the CPU 1 reads the texture address data and color-palette address data of the background 22*a* from the table 5*a*, and transfers to the image-forming processor 10 the read data, together with the polygonal-vertex address data. The process proceeds to step S04.

In step S04, the image-forming processor 10 defines the image-forming range of the background 22*a* in the display area of the buffer 11, based on the polygonal-vertex address data transferred in step S03.

In step S05, the image-forming processor 10 reads the texture data and color-palette data of the background 22*a* from the non-display area of the buffer 11, based on the texture address data and color-palette address data transferred in step S03. The image-forming processor 10 generates the display-image data of the background 22*a* in the image-forming range defined in step S04, based on the read texture data and color-palette data of the background 22*a*. The process proceeds to step S06. When the storage contents of the display area of the buffer 11, at the termination of step S05, are output to the television monitor 22, the image of the background 22*a* shown in FIG. 3A is displayed on the display screen of the television monitor 22.

In step S06, the CPU 1 reads the absolute coordinate data of object A from the table 5*a*, and transfers the read data to the graphics processor 3. The process proceeds to step S07.

In step S07, the graphics processor 3 transforms the absolute coordinate data of object A, transferred in step S06, to polygonal-vertex coordinate data. The graphics processor 3 transfers the transformed polygonal-vertex coordinate data to the CPU 1. The process proceeds to step S08.

In step S08, the CPU 1 reads the texture address data of object A and the address data of the shadow-palette data 31 from the table 5*a*, and transfers to the image-forming processor 10 the read data, together with the polygonal-vertex address data. The process proceeds to step S09.

As shown in FIG. 7, in step S09, based on the polygonal-vertex address data transferred in step S08, the image-forming processor 10 defines the image-forming range of object A in the display area of the buffer 11, namely, a range (superposing range) in which object A is superposed on the background 22*a*. The process proceeds to step S10.

In step S10, the image-forming processor 10 reads the texture data and shadow-palette data 31 of object A from the non-display area of the buffer 11, based on both the texture address data and the address data of the shadow-palette data 31 transferred in step S08. The image-forming processor 10 generates the first composite-color data of object A in the image-forming range defined in step S09, based on the read texture data and shadow-palette data 31 of object A, and the image display data of the background 22*a* generated in step S05. In other words, the image-forming processor 10 uses the above-described subtraction to perform the color mixing of the colors of the background 22*a* and the colors of the shadow-palette data 31. The first composite-color data is stored in the display area of the buffer 11. The process proceeds to step S11. When the storage contents of the buffer 11, at the termination of step S10, are output to the television monitor 22, the background 22*a* and the image of object A, shown in FIG. 3B, are displayed on the display screen of the television monitor 22.

In step S11, the CPU 1 reads the absolute coordinate data of object A from the table 5*a*, and transfers the read data to the graphics processor 3. The process proceeds to step S12.

In step S12, the graphics processor 3 transforms the absolute coordinate data of object A, transferred in step S11, to polygonal-vertex coordinate data. The graphics processor 3 transfers the transformed polygonal-vertex coordinate data to the CPU 1. The process proceeds to step S13.

In step S13, the CPU 1 reads the texture address data and color-palette address data of object A from the table 5*a*, and transfers to the image-forming processor 10 the read data, together with the polygonal-vertex address data. The process proceeds to step S14.

In step S14, based on the polygonal-vertex address data transferred in step S13, the image-forming processor 13 defines the image-forming range of object A in the display area of the buffer 11, namely, a range in which object A is superposed on the background 22*a*. The process proceeds to step S15.

In step S15, the image-forming processor 10 reads the texture data and color-palette data 30 of object A from the non-display area of the buffer 11, based on the texture address data and color-palette address data transferred in step S13. The image-forming processor 10 generates the second composite-color data of object A, based on the read texture data and color-palette data 30 of object A, and the first composite-color data generated in step S10. In other words, the image-forming processor 10 performs the color mixing of the colors of the first composite-color data generated in step S10 and the colors of the color-palette data 30. The second composite-color data is stored in the display area of the buffer 11. The process proceeds to step S16.

In step S16, the image-forming processor 10 outputs the storage contents of the display area of the buffer 11, at the termination of step S15, to the television monitor 22 so that the translucent image of object A superposed on the background 22*a* is displayed in the second composite color on the display screen of the television monitor 22.

The above-described steps S11 to S14 may be omitted by modifying step S08 so that the color-palette address data of object A can be transferred to the image-forming processor 10. In addition, when step S10 ends, the storage contents of the display area of the buffer 11 may be once output to the television monitor 22. [Application]

Figure 8:
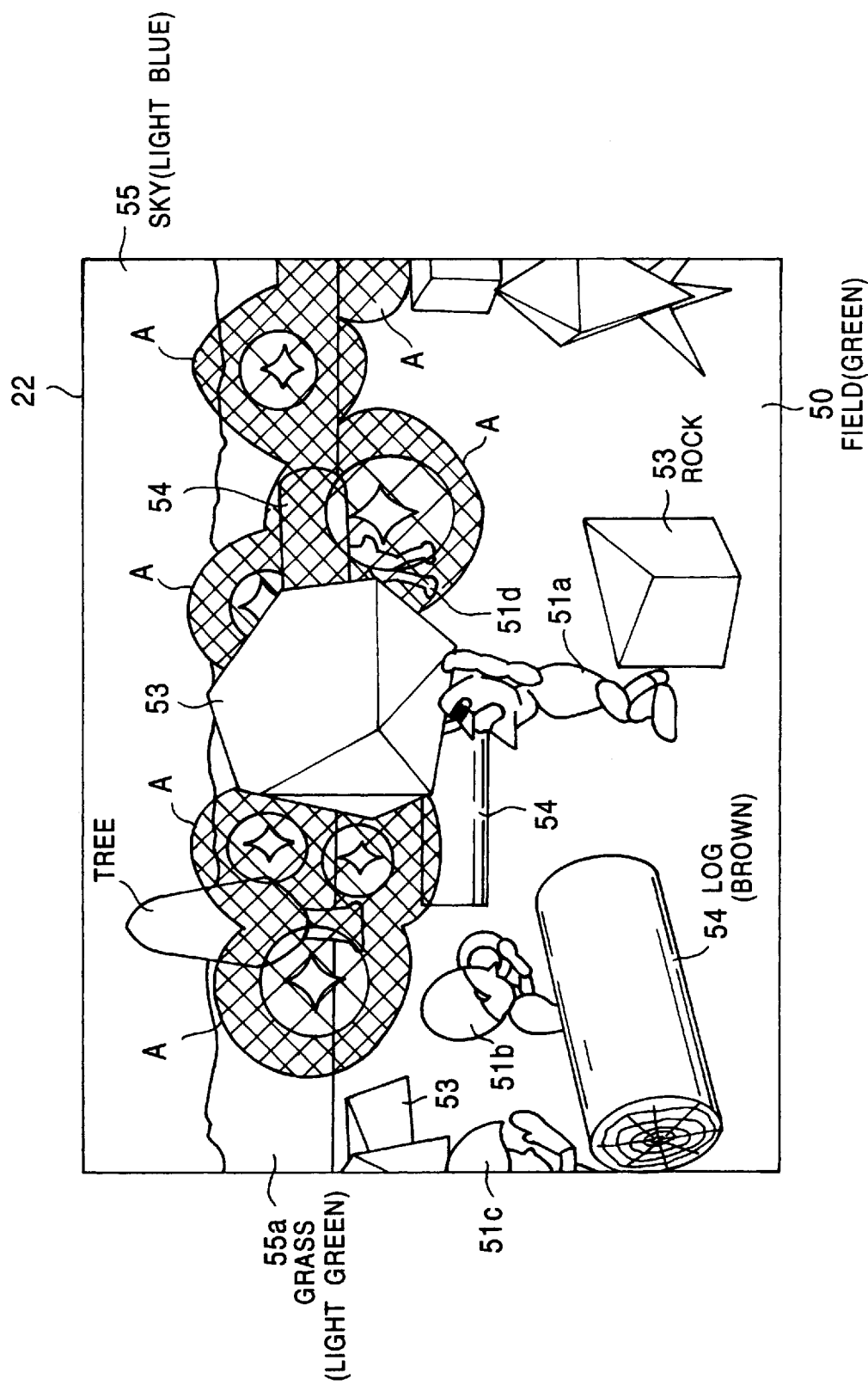
FIG. 8 is a display screen view obtained when a translucent-image display method according to the present invention is used for a video game.

FIG. 8 shows an example of a display screen for a video game to which a translucent-image display method is applied. This video game is an action game in which, in a field 50 having a rock 53 and a log 54, and a plurality of human characters (characters 52*a* to 51*d* shown in FIG. 8) operable with the controller 21, two characters throw the rock 53 or the log 54 to each other, and either one who first reduces the shield value of the opponent becomes a winner.

The example of the display screen shown (in FIG. 8) has the field 50, whose color is green and which is provided on the bottom of a virtual three-dimensional game space, and the background 22, which is composed of light-green grass 55*a* provided at the end of the field 50 and a light blue sky 55. In the field 50 are displayed the characters 52*a* to 51*d*, the rock 53, the log 54, and so forth. The example shows a case where the character 51*b* is about to attack with a deadly blow in which spherical light expands. In other words, the translucent images of a plurality of circular objects A representing spherical light are superposed on the background 22, the object representing a tree, the log 54, and the character 51*d*. The translucent image of each object A is displayed so that its innermost part is yellow and its outermost part is red, with orange provided between the parts.

[Effects of Embodiment]

According to this embodiment, shadow-palette data 31 composed of achromatic colors having a lightness identical to that of the colors of the color-palette data 30 of object A is prepared, and the colors of the shadow-palette data 31 and the background 22 are mixed by subtraction to once make the color of object A dark before the colors of the color-palette data 30 are generated by second addition. Thus, the translucent images of the objects A can be displayed in colors having shade, regardless of the lightness of the colors of the background 22. Accordingly, even when the background 22 of the game space is displayed in bright colors so that the game space is directed to have a bright image, the translucent image of each object or character can be properly displayed in colors having a shade.

In addition, the color (first composite color) of object A, at the termination of step S10 (shown in FIG. 7), is black (R:0%; G:0%; B:0%) or a color close to black. Thus, the color of object A, namely, the color of the translucent image of object A, at the termination of step S15, has a color almost identical to the color of the color-palette data 30. Accordingly, differently from the conventional translucent-image display method, it is not necessary to determine the color of the base, and the color of the object (colors of the color-palette data 30) before performing the color mixing in consideration of the color of the translucent image of object A. This is effective in that one type of color-palette data can be used when the translucent image of object A is normally displayed, and in the progress of the game, the translucent image of object A is displayed in the color of object A when it is opaque.

In the foregoing embodiments, object A has only one type of color-palette data 30. However, two types of color-palette data 30 may be selectively used for the cases of displaying the opaque image of object A and displaying the translucent image of object A.

In addition, light blue and green are used for the background 22a superposed on object A. However, any colors may be used for the background 22a. For example, white or gray having a high lightness may be used for the background 22a.

What is claimed is:

1. A translucent-image display apparatus comprising:
    an image-data storage unit in which lower image data to be displayed on a screen, and upper image data to be displayed on the lower image are stored;
    a color-palette storage unit in which color-palette data of the lower image, and color-palette data of the upper image are stored;
    a shadow-palette storage unit in which achromatic data having a brightness level identical to the brightness level of each color included in the color-palette data of the upper image is stored;
    a range defining unit for defining a superposing range in which the upper image is superposed on the lower image, based on said lower image data and said upper image data;
    a first composite-color generating unit for generating first composite color data by subtracting the color represented by the achromatic data from the color of the lower image in the superposing range, based on the color-palette data of the lower image and the achromatic data;
    a second composite-color generating unit for generating second composite color data by adding the color represented by the color-palette data of the upper image to said first composite color data; and
    a translucent-image display processor for translucently displaying on the screen the upper image in said second composite color, based on said second composite color data.

2. A translucent-image display apparatus according to claim 1, wherein said first composite-color generating unit generates said first composite color data so that the first composite color is darker than the color represented by the color-palette data of the lower image.

3. A translucent-image display apparatus according to claim 1, wherein said second composite-color generating unit generates said second composite color data so that said second composite color is almost identical to the color represented by the color-palette data of the upper image.

4. A translucent-image display method comprising the steps of:
    reading lower image data to be displayed on a screen, and upper image data to be displayed on the lower image;
    reading color-palette data of the lower image and color-palette data of the upper image;
    reading achromatic data having a brightness level identical to the brightness level of each color included in the color-palette data of the upper image;
    defining a superposing range in which the upper image is superposed on the lower image, based on said lower image data and said upper image data;
    generating first composite color data by subtracting the color represented by the achromatic data from the color of the lower image in the superposing range, based on the color-palette data of the lower image and the achromatic data;
    generating second composite color data by adding the color represented by the color-palette data of the upper image to said first composite color data; and
    translucently displaying on the screen the upper image in said second composite color, based on said second composite color data.

5. A computer-readable storage medium in which a computer program for causing a computer to perform a process for displaying a translucent image is stored,
    wherein the process comprises the steps of:
        reading lower image data to be displayed on a screen, and upper image data to be displayed on the lower image;
        reading color-palette data of the lower image and color-palette data of the upper image;
        reading achromatic data having a brightness level identical to the brightness level of each color included in the color-palette data of the upper image;
        defining a superposing range in which the upper image is superposed on the lower image, based on said lower image data and said upper image data;
        generating first composite color data by subtracting the color represented by the achromatic data from the color of the lower image in the superposing range, based on the color-palette data of the lower image and the achromatic data;
        generating second composite color data by adding the color represented by the color-palette data of the upper image to said first composite color data; and
        translucently displaying on the screen the upper image in said second composite color, based on said second composite color data.

* * * * *